March 14, 1950 A. V. LORD 2,500,839
SYNCHRONIZING PULSE SEPARATOR
Filed July 15, 1946
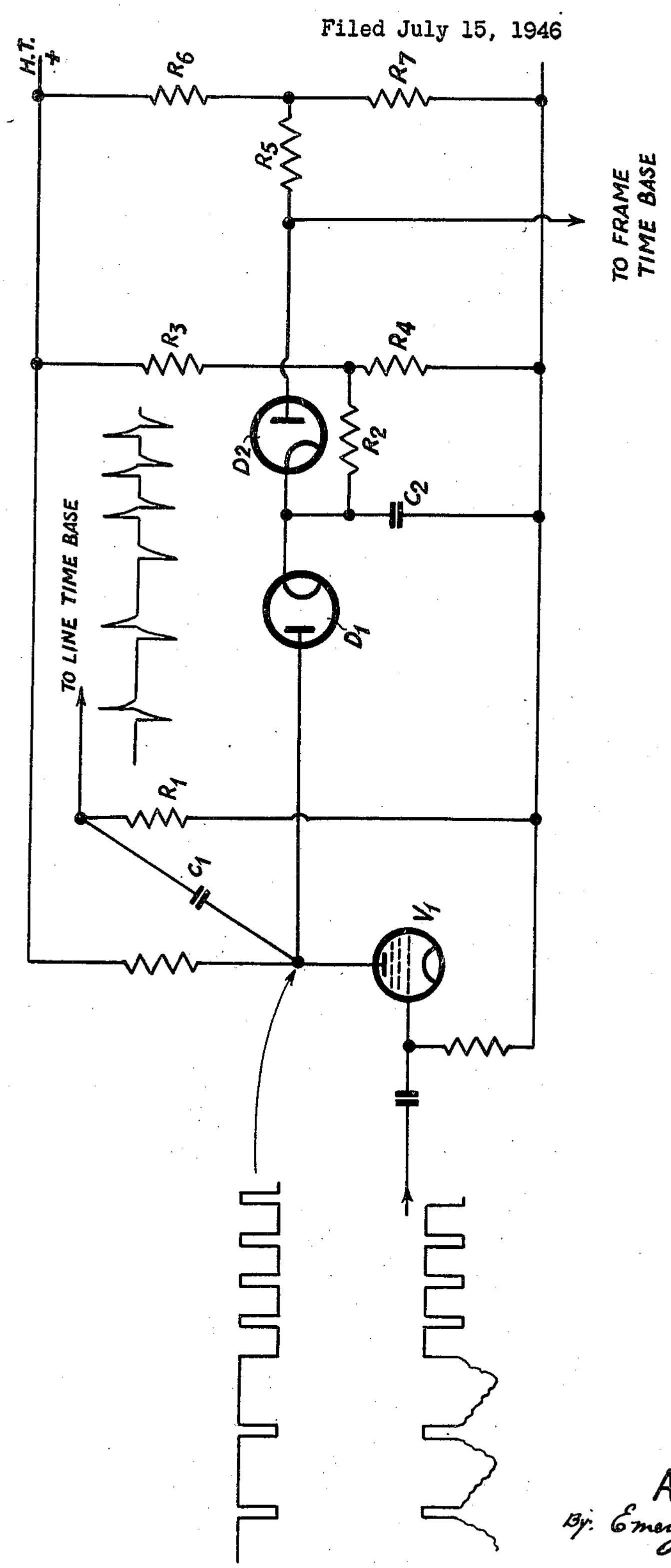
INVENTOR.
Arthur V. Lord
By: Emery, Holcombe & Blair
ATTORNEYS Patented Mar. 14, 1950 2,500,839

UNITED STATES PATENT OFFICE 2,500,839

SYNCHRONIZING PULSE SEPARATOR

Arthur Valentine Lord, Cambridge, England, assignor to Pye Limited, Cambridge, England, a British company Application July 15, 1946, Serial No. 683,700
In Great Britain July 14, 1945

3 Claims. (Cl. 178—7.3)

The present invention relates to arrangements for separating frame and line synchronising pulses in television and like systems. In such systems both the line and frame synchronising pulses are generally of substantially the same amplitude but are of different duration, the frame pulses being of longer duration than the line pulses.

Difficulties exist in separating the frame from the line synchronising pulses in the receiver, particularly when interlaced scanning of the picture is employed. The present invention relates to an improved method of effecting such separation.

The present invention consists in an arrangement for separating frame and line synchronising pulses, wherein the pulses are fed to a charge circuit which is charged up during the intervals between pulses and discharges during the periods of the pulses, said charge circuit being connected to a limiting device which conducts only during the frame synchronising periods due to the reduced potential of the charging circuit during the longer frame synchronising periods.

A feature of the invention consists in an arrangement for separating frame and line synchronising pulses, comprising means for feeding the pulses to the anode of a diode which is so biassed that the diode only conducts during the intervals between pulses, a condenser connected to the cathode of said diode which becomes charged during the intervals between pulses, a resistor for discharging said condenser, and a second diode having its cathode connected to said condenser and so biassed that it conducts only during the frame synchronising periods due to the reduced potential of the condenser during the longer frame synchronising periods.

In the preferred form of the invention for separating frame and line synchronising pulses in a television receiver, the incoming waveform is fed to a valve for separating the synchronising pulses from the picture intelligence and in such a manner that only the synchronising pulses cause the valve to conduct. The corresponding fluctuations in the anode potential of the valve, due to the voltage drop across a resistance in the anode lead of said valve, are fed to charge a condenser through a diode which only conducts when the separator valve is in the non-conducting state. The cathode of the diode is connected to the condenser which discharges through a resistor. The condenser is also connected to the cathode of a further diode which is so connected that it conducts only during the frame synchronising periods due to the reduced potential of the condenser during the frame synchronising periods. Therefore, the frame synchronising pulses are passed through this second diode and may be tapped off from the output thereof. The line synchronising pulses may be derived from a differentiating circuit fed from the output of the separator valve which separates the synchronising pulses from the picture intelligence.

In order that the invention may be more clearly understood, a preferred circuit arrangement will be described, by way of example, with reference to the accompanying drawing.

In the drawing, $V_1$ is the valve for separating the synchronising pulses from the picture intelligence and preferably comprises a pentode. The inverted incoming waveform is fed to the grid of the valve $V_1$ with the synchronising pulses having a positive sign and the valve is biassed to conduct only during the synchronising pulse periods. The anode potential of $V_1$ then has the waveform shown in the diagram adjacent thereto. The line synchronising pulses are derived from this waveform by the differentiating circuit comprising the condenser $C_1$ and resistance $R_1$ which produces double pulses corresponding to the vertical edges of the synchronising pulses as shown. The negative peaks constitute the line synchronising pulses and are fed to the line time base. The extra pulses occurring mid-way between the pulses corresponding to the line synchronising frequency do not interfere with accurate synchronisation as they have no effect upon the line time base.

The anode of the valve $V_1$ is also connected to the anode of a diode or rectifier $D_1$, the cathode of which is connected through a charge condenser $C_2$ to earth and through the resistance $R_2$ to a suitable point on the potential divider $R_3$, $R_4$. The cathode of diode $D_1$ is also connected to the cathode of a second diode $D_2$, the anode of which is connected through the resistance $R_5$ to a suitable point on the potential divider $R_6$, $R_7$. The diode $D_2$ serves for separating the frame synchronising pulses from the line synchronising pulses as will be hereinafter described.

The potential applied to the cathode of the diode $D_1$ from the potential divider $R_3$, $R_4$ is such that the diode $D_1$ only conducts when the valve $V_1$ is non-conducting, that is during the peaks of the potential waveform at the anode of $V_1$ corresponding to the intervals between the synchronising pulses. The resistance in the anode circuit of the valve $V_1$ and the condenser $C_2$ are of such value that, during the shorter intervals between frame pulses as well as during the longer intervals between line pulses, the condenser $C_2$ is fully charged irrespective of the potential to which it is discharged through the resistance $R_2$ during either frame or line synchronising pulses. During the longer frame pulses the condenser $C_2$ discharges to a lower potential than during the shorter line pulses. The anode of the diode $D_2$ is connected to such a point on the potential divider $R_6$, $R_7$ that its potential only exceeds the charge potential of the condenser $C_2$ during the frame pulse periods. The diode $D_2$ thus only conducts during the frame synchronising pulse periods and thus separates the frame synchronising pulse from the line synchronising pulses. The frame synchronising pulses appearing at the anode of the diode $D_2$ are fed to the frame time base, which synchronises on the first pulse of each group of frame pulses, thus ensuring accurate interlacing.

I claim:

1. Arrangement for separating frame and line synchronising pulses in television and like circuits, the frame synchronising pulses being of longer duration than the line synchronising pulses comprising means for feeding the pulses to a limiting device, means for biasing the limiting device so that it only conducts during the intervals between pulses, a condenser connected to be charged by the current flowing through the limiting device, a resistor for discharging said condenser, said condenser being charged fully during the intervals between the pulses and being discharged by different amounts during the differing periods of the frame and line pulses, a second limiting device connected to said condenser and means for biasing said second limiting device so that it conducts only during the frame synchronising pulses due to the more reduced potential of the condenser during the longer frame synchronising pulses.

2. Arrangement for separating frame and line synchronising pulses in television and like systems, the frame synchronising pulses being of longer duration than the line synchronising pulses, comprising a valve having its anode connected through an anode resistance to the positive pole of a direct current high tension supply, means for applying the synchronising pulses to the valve with such sign that the valve conducts only during the synchronising pulses, a first rectifier having its anode connected to the anode of said valve, means for applying a biassing potential to the cathode of said first rectifier of a value intermediate the potentials assumed by the anode of said valve when it is non-conducting and when it is conducting so that the diode only conducts when the valve is in the non-conducting state, a condenser connected to the cathode of said first rectifier which becomes fully charged to a maximum value during the intervals between pulses when the first rectifier is conducting, a discharge circuit connected to said condenser to discharge the condenser to different reduced potentials during the frame and line pulses when the first rectifier is non-conducting, a second rectifier having its cathode connected to the cathode of said first rectifier, and means for biassing the anode of said second rectifier to a potential intermediate the reduced potentials to which the condenser discharges during the frame and line pulses respectively, whereby said second rectifier conducts only during the frame synchronising pulses due to the more reduced potential of the condenser during the longer frame synchronising pulses.

3. Arrangement for separating frame and line synchronising pulses of different duration in television and like apparatus, comprising a diode having its anode connected to the positive pole of a source of direct current, means for varying the potential applied to said anode in accordance with the synchronising pulses, said potential being reduced during the periods of the synchronising pulses, a condenser connected between the cathode of said first diode and the negative terminal of said direct current source, a discharge resistor connecting the cathode of said first diode to a source of positive biasing potential having a value intermediate the potential applied to the anode during the synchronising pulses and the potential applied to the anode during the intervals between synchronising pulses, whereby the condensed becomes fully charged during the intervals between synchronising pulses and discharges to different reduced potentials during the periods of the frame and line synchronising pulses respectively, a second diode having its cathode connected to the cathode of the first diode, and means for biassing the anode of said second diode to a potential intermediate the different reduced potentials to which the condenser discharges during the frame and line synchronising pulses respectively.

ARTHUR VALENTINE LORD.

REFERENCES CITED

The following references are of record in the file of this patent:

UNITED STATES PATENTS

| Number | Name | Date |
|---|---|---|
| 2,210,523 | Blumlein | Aug. 6, 1940 |
| 2,260,963 | Wilder | Oct. 28, 1941 |
| 2,308,375 | Loughren | Jan. 12, 1943 |

FOREIGN PATENTS

| Number | Country | Date |
|---|---|---|
| 190,263 | Australia | Apr. 11, 1940 |